United States Patent [19]

Kulakowski et al.

[11] Patent Number: 4,814,903

[45] Date of Patent: Mar. 21, 1989

[54] ALTERNATE STORAGE AREAS IN MAGNETOOPTICAL MEDIA

[75] Inventors: John E. Kulakowski; Rodney J. Means, both of Tucson, Ariz.

[73] Assignee: International Business Machines Corporation, Armonk, N.Y.

[21] Appl. No.: 67,762

[22] Filed: Jun. 29, 1987

[51] Int. Cl.$^4$ .......................... G11B 5/09; H04N 5/76
[52] U.S. Cl. ........................................ 360/48; 369/59
[58] Field of Search ....................... 360/48, 49, 54, 61; 369/59

[56] References Cited

U.S. PATENT DOCUMENTS

| | | | |
|---|---|---|---|
| 3,931,457 | 1/1976 | Mes | 178/6.6 |
| 4,094,013 | 6/1978 | Hill et al. | 365/234 |
| 4,347,527 | 8/1982 | Lainez | 358/4 |
| 4,420,807 | 12/1983 | Nolta et al. | 364/200 |
| 4,523,304 | 6/1985 | Satoh et al. | 369/32 |
| 4,535,439 | 8/1985 | Satoh et al. | 369/275 |
| 4,583,166 | 4/1986 | Hartung et al. | 364/200 |
| 4,656,532 | 4/1987 | Greenberg et al. | 360/48 |

OTHER PUBLICATIONS

IBM Technical Disclosure Bulletin, vol. 25, No. 11B, Apr. 1983, pp. 6103–6104, by Lowdermilk.
Copending Commonly Assigned Application for U.S. Pat. Ser. No. 030,393 filed Mar. 26, 1987 (TU985007).

*Primary Examiner*—Vincent P. Canney
*Attorney, Agent, or Firm*—H. F. Somermeyer

[57] ABSTRACT

A data recorder, preferably of the magnetooptic type, employs a rotating record storage disk. The record storage disk has a track starting primary data storing sector circumferentially adjacent to the track starting sector or a small plurality of alternate data storing sectors which are not addressable directly by mechanisms outside of the recorder as are the primary recording sectors. Whenever a one of the primary sectors in a given track is found to be defective, then one of the alternate sectors in that same track receives data from a one of the primary storing records of sectors in the same track. A small number of alternate sectors are selected to extend circumferentially for creating an elapsed scan time over the element of sectors not less than the elapsed time required for the recorder to switch from scanning one track to scanning an adjacent one of the tracks. In a magnetooptic recorder, the elapsed time selected for scanning the small plurality of alternate sectors is also not less than the time to reverse the magnetic biasing field for erasing and recording on the disk. Alternate sectors provide both for alternate data storage and for the preparatory steps of track jumping or switching and magnetic field bias reversal. Second alternate ones of the tracks are selected in the event all of the alternate sectors in a given track are filled with data from defective ones of the primary sectors in the same track as the alternate sectors.

17 Claims, 5 Drawing Sheets

ALTERNATE STORAGE AREAS IN MAGNETOOPTICAL MEDIA

DOCUMENT INCORPORATED BY REFERENCE

Copending commonly assigned application for patent D. M. Oldham Ser. No. 944,407 filed Dec. 22, 1986 (TU986004).

FIELD OF THE INVENTION

The present invention relates to improved methods, apparatus and articles particularly adapted for use with magnetooptic recording techniques.

BACKGROUND OF THE INVENTION

The use of alternate storage areas in record disks for replacing defective storage areas has been widely practiced in magnetic recording particularly for the direct access storage devices (DASD) which employ a high quality low defect rate high density recordable magnetic media. Generally, the addressing of such media is by physical addresses of so called sectors which are readily physically identifiable on each such medium. As a result, a host processor or other programmable device which is employing a DASD, accesses the data by physically addressing the various sectors containing the desired data or in which data is desired to be recorded In these devices, even with low defect rates, occasionally a sector may have insufficient recording capability for successfully recording data. Each such defective sector is marked as not being available, i.e., "demarked", showing that it is incapable of storing sufficient data to warrant being used as an addressable data storing sector. Since the programs in a host processor or other programmable devices will continue to use such a sector address, then a system for accommodating such programming and yet providing a storage area to replace the defective sector has been used.

Each of the DASD's employ a so-called alternate tracks which provide alternate data storing areas for accommodating the defective primary data storing sectors. An example of such an arrangement is shown in the Nolta et al U.S. Pat. No. 4,420,807 which shows a system for "pinning" data from such alternate tracks into a data buffer of the host processor or intermediate control unit. The system described in the Nolta et al patent accommodates low defect rates rather handily and with low overhead in the DASD data storing medium. However, when record media are employed having a relatively high defect rate, i.e., where one can expect a large number of defective sectors, then the techniques described in the Nolta et al patent are not satisfactory. A performance problem arises in that each time an alternate track has to be accessed to replace a defective sector, the access time dramatically increases. The increase is caused by having to seek to the alternate track.

Currently high defect rate media includes most optical media For example in some optical media, the defect rate may be high enough such that there is a 2% or higher chance that a defective sector will be found in each of several recording tracks in a record medium. Explaining further, each record disk is divided into a large number of circularly concentric tracks or a single spiral track comprised in a plurality of substantially concentric circumvolutions or turns of the spiral. Each of the tracks is arbitrarily divided into a smaller plurality of circumferentially addressable data storing areas commonly called sectors. Even with a 2% defect rate, every two to four tracks could have a defective sector requiring access to an alternative data storage area in the respective two to four tracks, i.e., in 50% to 25% of the track accesses an alternate sector would have to be accessed. Such an access requirement utterly destroys the performance of such data storage devices An alternate technique to the above cited Nolta et al alternate track scheme is shown in copending commonly-assigned application for patent Ser. No. 30,393, filed Mar. 26, 1987, wherein rather than physically addressing each sector, logical addressing of each sector is provided for accessing sectors of a disk record surface. For data integrity and media integrity purposes, a complete directory of the logical addresses to the physical addresses on each disk medium is provided. Such a directory insulates the physical addressing of the media from the using host processor and its incorporated programming. According to the copending application, rather than using an alternate track for having alternate data storing sectors, the patent application teaches that once a defective sector is encountered during recording, it is merely omitted from the directory. That is, in the recording operation the defective sectors are demarked and the recording proceeds to the next available sector to continue the recording. The defective sector is not available because it is not addressable using the logical directory structure shown of the copending application. Extensive control data structures are described for accommodating this arrangement. The referenced patent application also teaches that it may be desirable in such media to provide for physical addressing for the sectors, such as described in Nolta et al.

Accordingly, it is still desired to provide for an efficient low cost alternate sector scheme for employment with diverse media, particularly those media having a relatively high media defect rate.

Another factor in disk storage devices, such as DASD, is the access time when the transducer is be moved from a track currently being scanned to an adjacent track. Such track changing, commonly referred to as track switching or track jumping, requires a relatively long period of time, i.e., several sectors of the disk medium could have passed during such track jumping or switching. Such time delay can cause the loss of rotational position synchronization requiring that rotational synchronization between the host processor computer program execution and the data storage device to be reestablished. This problem is addressed in the IBM Technical Disclosure Bulletin in an article by D. J. Lowdermilk in an article entitled "Method for Microcode Conversion of Logical Sector Addresses to Physical Sector Addresses", April 1983, Vol. 25, #11B on pages 6103-4. According to this article, the potential rotational position loss is accommodated by establishing logical sectors for accessing a DASD magnetic medium. Each of the logical sectors are offset by 90 degrees ($\frac{1}{4}$ of a disk rotation) for allowing ample time for track switching or jumping. However, since the logical sectors are removed from the physical sector addressing, the data storage device, or its control unit, must convert the logical sectors to physical sectors. Such conversion has to be done in real time to ensure no loss of rotational synchronization between the disk medium and the executing host processor programs. A practical effect of the logical offset is to make each track appear to begin at successive 90 degree displacements around the disk such that a quarter track switch elapsed time is provided between the end of one track and the beginning of the next radially inward-most track. Note that this scheme only allows track switching without loss of rotational synchronization when moving a transducer radial inwardly. If the tracks are being read successively radially outward, this synchronization maintenance is not available under the logical offset arrangement.

A system for avoiding losing rotational position synchronization while maintaining rapid access to data areas is proposed by Hartung et al in U.S. Pat. No. 4,583,166. A so-called "roll mode" is provided such that reading or writing can ensue at any rotational position of the disk medium with respect to the program execution in the host processor. A cylinder of tracks (a plurality of tracks on a plurality of medium mounted on a common shaft having the same radial position as a cylinder) enables using a roll mode with a plurality of record media mounted on a common shaft. It should be noted that this desired access performance is useful only for all tracks in a single cylinder, i.e., where there is no radial motion between the transducer and the record medium. Electronic switching switches the circuits between various transducers respectively operatively associated with a plurality of axially-aligned record media.

It is still desired, therefore, to provide for a more efficient switching between tracks while maintaining rotational synchronization between a disk record medium and host program execution. In this context, host program execution may be limited to execution of an operating system portion related to accessing the data storage device.

In optical storage media, defect rates become more severe because of extremely high areal density employed. For example, in current optical media today, the areal density of the optical media is 7 to 10 times that of the areal density of magnetic media. Therefore, even though the quality of the coating of the optical media may be very similar to the quality of the magnetic coating, because the area used to store a bit is so much smaller in the optical media, a much smaller defect has a more significant and potentially devastating effect on the recording quality. Therefore, optical media should be utilized such as to efficiently accommodate the effect of defects.

Another aspect of optical disks is that the extremely large storage capacity, i.e., several hundred megabytes to several gigabytes per disk surface, indicates that extensive data streaming recording and readback may be employed. An example of long data streaming is that of video recording, i.e., a motion picture for example could be recorded as a single data stream on an optical disk recorder which results because of the graphics involved in extremely long data stream. Of course, such long data streams are not limited to video but can include large data bases of all types.

Some disk recorders are particularly adapted for recording video and/or audio, both having relatively long data streams. Since such data is read as a single continuum, spiral tracks have been employed in such recorders. This fact merely means that the transducer begins track following at an outer radial position and continues to follow the successive circumvolutions or turns of a spiral toward a radial inward-most position of the disk medium. Such an arrangement avoids track jumping and/or switching when a complete movie or complete data base is recorded or read from a disk.

However, even in video, it is desired to read selected portions of a video sequence. Reading such portions is often called "stop motion" or "stop frame". Such stop motion requires jumping from a radial inward end of a single spiral to the radial outward end of that same spiral. This arrangement also requires that an integral number of video frames or a single video frame be recorded in each of the individual circumvolutions. Such track jumping in a spiral track arrangement is often accommodated by dedicating a portion of the record medium as a "jumping sector". In such a jumping sector no video, audio or data signals are recorded; rather, the sector is used only for enabling the transducer or light beam in many video recorders to move from the radial inward end of a circumvolution to its radial outward end. An example of such a dedicated jumping sector is shown in the Mes U.S. Pat. No. 3,931,457. See jumping sector numbered 4. Also see Satoh et al U.S. Pat. No. 4,535,439 which shows dummy or jumping regions 14a, 14b, 15a and 15b.

Not all optical disks employ such dedicated jumping sectors. For example, an optical disk without jumping sectors is shown in Satoh et al U.S. Pat. No. 4,523,304; Hill et al U.S. Pat. No. 4,094,013 (which employs sector servos) and; Lainez U.S. Pat. No. 4,347,527. The latter three patents are all for data storage rather than for video storage. What this really means is that the design of the optical disk for data storage apparently assumed random access as opposed to serial or sequential access as provided in video. It also could assume that most of the data stored as an addressable unit on the disk can be stored within a single track or circumvolution. The above statements apply to read only disks, write once read many disks as well as erasable or recordable disks.

With larger disk capacities, larger data bases will be recorded on individual disks, yet the disk format and operation should still accommodate longer data bases while allowing random accesses for smaller data or graphics recordings. Also, as the use of graphics increase, then more images will be stored as "non-coded" data. Such image storage requires more data storage space than encoded data. This fact again indicates a combination of addressable data units if greater diverse sizes will be stored on disks in the future.

While error detection and correction codes (hereinafter referred to as ECC) can accommodate a lot of media defects, each ECC requires the storage of data redundancies for enabling the ECC to be used for reconstructing data that is read back in error. With the high areal densities of optical disks and the defect-prone media, to get an effective ECC may require more than 50% of the disk to be dedicated for storing the ECC redundancies. It is believed to be more cost effective for using an ECC of moderate capability and using alternate sectors for replacing sectors incapable of storing data reliably using the moderate capability ECC. Such an arrangement can be used with any type of optical recording as well as other types of recording as vertical magnetic recording, etc.

Various forms of optical recording have been used throughout the years. Photographic media had been used in both the disk and raster form. For example, an early optical record medium is shown by King et al in U.S. Pat. No. 2,843,841. Here a photographic reproduction of alternate dark or opaque and transparent areas on either a glass or a plastic substrate stored digital data. King et al employed concentric tracks with no jumping sector. Magnetooptic media have been available throughout the years such as disks employing an alloy of a rare earth and a transitional metal as taught by Chadhari et al U.S. Pat. No. 3,949,387. Phase change optical media, such as shown in U.S. Pat. No. 3,271,591, uses changes between a morphous and crystine state to optically record information. Other forms of recording include the so-called ablative wherein a reflective layer is changed such that it becomes less reflective. Other read only optical disks have the information molded in as undulations, bumps or grooves such as shown in U.S. Pat. Nos. 3,427,628, 3,438,050 and 2,985,866 among many other patents too numerous to list.

In magnetooptic recording, which uses rewritable or erasable recording media, a preferred recording medium, requires in each recording area erasure of recorded data before new data can be written. Generally in magnetooptic recording, the magnetic dipole is disposed transversely to the plane of the disk such that a north dipole at the sensing surface of the medium is a binary 1 while a south pole at the medium surface is a binary 0. Before the data can be rewritten, to a given track on the disk, such disk track must be first erased to the binary "0" state which takes one rotation of the disk. Upon completion of that rotation, the data can be written which requires a second disk rotation. If the recording is to be verified, then a third disk rotation is required. It should also be noted that the magnetic field used for recording and erasing is oppositely oriented with respect to the plane of the disks. This means that between the recording and erasure steps that the recording bias magnetic field is reversed. Since the time for reversal of a magnetic field is finite, the format of a magnetooptic disk should accommodate the reversal time of the biasing magnetic field while a jumping sector could be dedicated for accommodating the magnetic field reversal. It is desired to maximize the storage space of a disk, therefore, it is desired to avoid dedicating a jumping sector as well as a magnetic field reversal time. An example of an accommodation for magnetic field reversing for recording is shown by Oldham in his patent application Ser. No. 944,407, filed Dec. 22, 1986. While Oldham solved many of the problems, it was still desired to provide for reversal of a magnetic field without losing synchronization of the rotation of the disk medium to the program execution of the host processor.

Based on all of the above, it is seen that a simple yet effective solution to the problems of maintaining rotational synchronization while utilizing a maximal amount of the record medium yet providing for alternative data storage areas is needed if optical disks are to be truly successful in high performance data storage systems.

SUMMARY OF THE INVENTION

It is an object of the present invention to provide an enhanced alternate signal storage area procedure and arrangement while maintaining high performance in information signal recorders.

The invention provides a record disk having a first plurality of tracks with each track being divided into a second plurality of circumferentially extending signal storing sectors a relatively small plurality (for example, 3) of the sectors in each and every one of the tracks and disposed circumferentially adjacent a beginning or end of each track as alternate data storage areas for that track. The alternate areas also provide for track switching, and in magnetooptic recorders provide for reversing the magnetic bias field between erasure and recording operations. The number of sectors is preferably at least one greater than the nominal time for track switching at least one track position or for the magnetic reversal. This means that one of the alternate sectors can be used while maintaining rotational synchronization of the disk with using computer apparatus.

The alternate sectoring is provided both at format time (when the disk is first formatted) and post-format time. When the disk record medium is first formatted, defective sectors, i.e., those sectors incapable of storing a sufficient amount of information signals, are demarked with the number of the sector being reassigned to the next available sector in the same track. For each defective sector in a track, one of the small pluralities of alternate sectors are assigned to receive the data destined for the defective sector. This arrangement preserves multi-track operation without losing rotational synchronization between the disk medium and host processor program execution. It also maintains desired clustering of sectors for storage of diverse data and other files.

The number of alternate or spare sectors can be minimized further by circumferentially offsetting the physical beginning of tracks while still maintaining the advantages of the present invention.

Post-formatting assignment of alternate sectors within a track follow the procedures used in the initial formatting of a track.

Methods for operating a magnetooptic recorder using the above-described arrangements provide for enhancement of performance by maintaining rotational synchronization of other magnetooptic record medium with host processor program execution particularly when data files or video files are being recorded or read and which contain information-bearing signals exceeding the capacity of one track in circumvolution.

The foregoing and other objects, features, and advantages of the invention will be apparent from the following more particular description of preferred embodiments of the invention, as illustrated in the accompanying drawings.

DETAILED DESCRIPTION OF THE PREFERRED EMBODIMENTS

Figure 1:
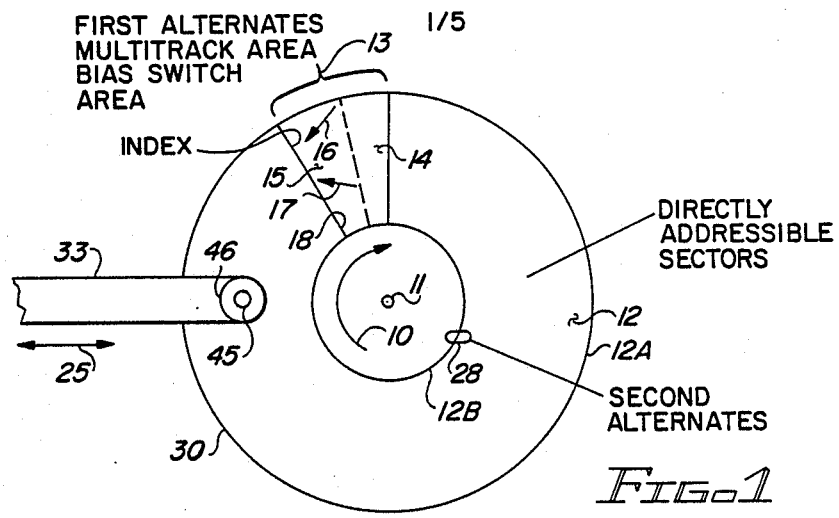
FIG. 1 illustrates a disk format in accordance with the present invention with an illustration of accessing characteristics for various record tracks on the record medium.

Referring now more particularly to the drawings, like numerals indicate like structural features and methods useable in and with the present invention. FIG. 1 diagrammatically illustrates a magnetooptic disk 30 rotatable in the direction of arrow 10 about axis of rotation 11. Information-bearing signals are optically recordable on and readable from a recording area 12 which is bounded by a radially outward-most record track 12A and a radially inward-most record track 12B. The physical peripheral edge of disk 30 is not shown in FIG. 1. Circumferential portion 13 of recording area 12 contains alternate data-storing sectors extending radially of the recording area 12. The circumferential length of alternate sectors 13 is selected in accordance with track switching or jumping elapsed time requirements and the time for reversing a magnetic bias field for the magnetooptic recorder shown in FIG. 2. A first sector or sectors 14 are those in addition to the other alternate sectors 15 of area 13 which exceed the minimum track switching and bias field switching elapsed time requirements. The sector or sectors 14 are the first alternate storage areas used in the event any sector in recording area 12 outside of area 13 that is or becomes unrecordable, i.e., are sufficient sectors to have a high probability of satisfying a need for spare sectors in the track Sectors 15 have a low probability of actually being used as spares. This selection maintains the track jumping and magnetic field switching times for the respective tracks for an expected maximal number of defective sectors in each of the tracks.

Arrow 16 indicates a radially inward track jump which can be achieved between two radially adjacent tracks of recording area 12 in the radially inward direction. Similarly, arrow 17 indicates a like track jump in a radially outward direction. In the illustrated embodiment, area 15 contained two track sectors while area 14 contained one track sector, no limitation thereto intended. An index line 18 extends radially of recording area 12 for indicating the beginning and end of each of the tracks in recording area 12. The tracks extend circumferentially from the index counterclockwise to reach the respective sectors 14 which include the first alternate sector for each of the tracks. This arrangement provides for the simplest assignment of alternate sectors within each of the tracks by a "push down" technique of reassigning a next circumferentially located sector for receiving data originally destined for a defective sector. The push-down assignment is in a circumferential direction opposite to the direction rotation of the record medium.

Figure 2:
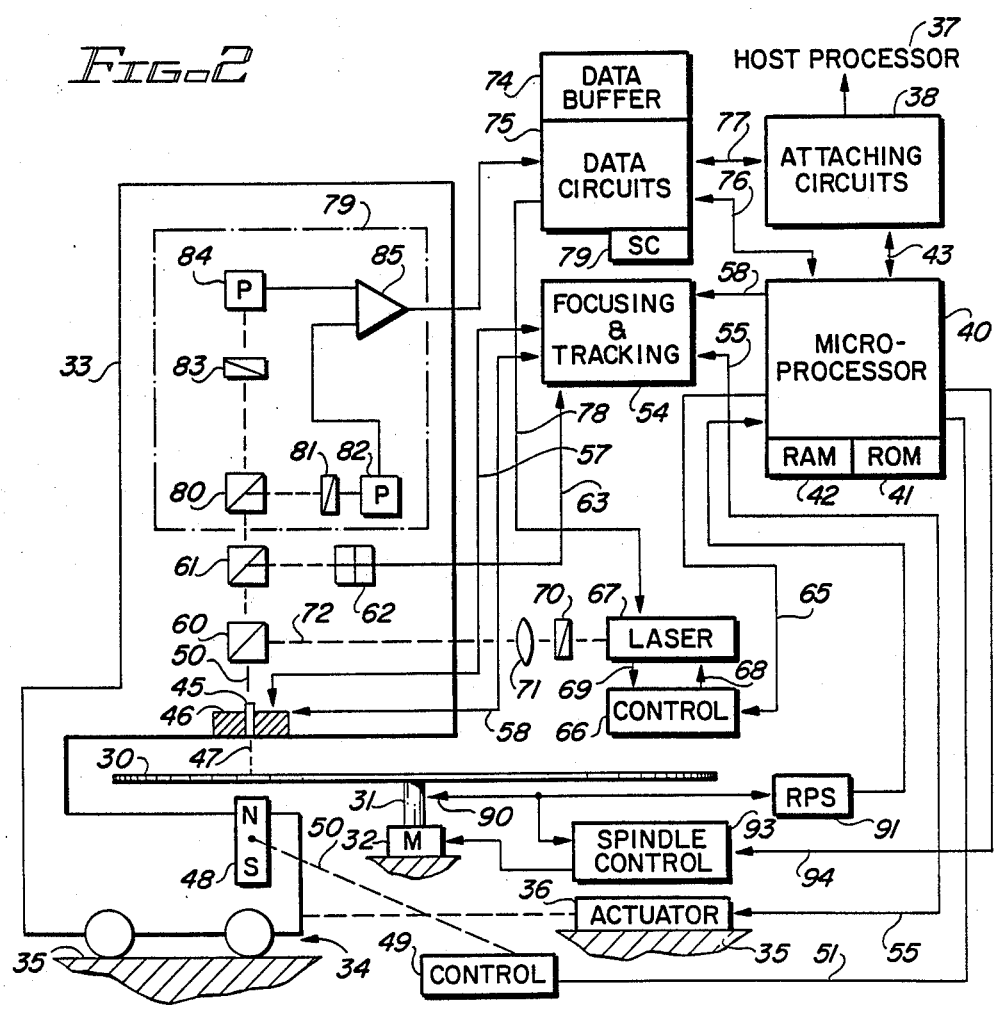
FIG. 2 is a block diagram of a magnetooptic record player constructed to utilize the present invention.

Whenever all of the alternate sectors 14 and 15 of a given track have been assigned for accommodating defective sectors, then the entire track can be deemed to be incapable of storing sufficient data for maintaining the performance requirements of the recorder shown in FIG. 2. In this instance, a second set of alternate sectors in second alternate set of tracks 28 is assigned to the defective track as in the radially inward-most track 12B. These can be ten or more tracks in set 28. The procedure here can be varied with application of the invention. Alternate tracks can be located at several radial positions on the disk for increasing performance when using alternate tracks. When four sectors in a given track are defective and area 13 has three alternate sectors, then the complete track 12B can be assigned to replace the track having four or more defective sectors. On the other hand, individual sectors of track 12B may be assigned as alternate sectors for a plurality of tracks having four or more defective sectors. It should be noticed that when any sector 15 of the alternate sectors has been assigned, the advantages of the track jumping and bias switching with maintenance of disk rotation synchronization to host processor program execution is lost for that single track. To minimize this effect, the number of sectors assigned as alternates in circumferential area 13 is selected to reduce the number of defective sectors any given track exceeding the number selected for area 14.

FIG. 1 also diagrammatically illustrates a head arm 33 which is radially moveable across the recording area 12 as indicated by double-headed arrow 25. At the distal end of head arm 33, an objective lens 45 is mounted within a so-called fine actuator 46 which moves the objective lens toward and away from the disk 30 for focusing and radially for track following and for track jumping, as will become apparent. The electromechanical characteristics of fine actuator 46 determine track jumping time and the number of sectors selected to be alternate sectors 15.

An optical recorder with which the present invention may be advantageously employed is shown in FIG. 2. A magnetooptic record disk 30 is mounted for rotation on spindle 31 by motor 32. Optical head carrying arm 33 on head arm carriage generally denoted by numeral 34 moves radially of disk 30. A frame 35 of the recorder suitably mounts carriage 34 for reciprocating radial motions. The radial motions of carriage 34 enable access to any one of a plurality of concentric tracks or circumvolutions of a spiral track for recording and recovering data on and from the disk. Linear actuator 36, suitably mounted on frame 35, radially moves carriage 34 for enabling the track accessing. The recorder is suitably attached to one or more host processors 37, such host processors may be control units, personal computers, large system computers, communication systems, image processing processors, and the like. Attaching circuits 38 provide the usual logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program, or microcode, stored in read only memory (ROM) 41 and a data and control signal storing random access memory (RAM) 42. This microcode enables microprocessor 40 to operate the FIG. 2 recorder as described with respect to FIGS. 7-9 and for effecting other machine operations usually employed in signal recorders.

The optics of the recorder include an objective or focusing lens 45 mounted for focussing and tracking motions on head arm 33 by fine actuator 46. Actuator 46 includes mechanisms for moving lens 45 toward and away from disk 30 for focussing as well as radial movements for track following and seeking movements. The seeking range includes up to 100 tracks so that carriage 34 need not be actuated each time a track adjacent to a track currently being accessed is to be next accessed. Numeral 47 denotes the two-way light path between lens 45 and disk 30. The coarse actuator continually follows the fine actuator for monitoring as much as possible the fine actuator at the radial center of the fine actuator's range of motion.

In magnetooptic recording, magnet 48 provides a magnetic steering or bias field for controlling the remanent magnetization direction of a small spot on disk 30 illuminated by laser light from lens 47. The laser light spot heats the illuminate spot on the record disk to a temperature above the Curie point of the magnetooptic layer (not shown, but can be an alloy or rare earth and transitional metals as taught by Chaudhari et al, U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones are recorded on disk 30 normally are "north pole remnant magnetization". To erase disk 30, magnet 48 rotates for moving the south pole adjacent to disk 30. Magnet 48 controls 49, which is mechanically coupled to rotatable magnet 48 as indicated by dashed line 50, controls the write and erase directions. Magnet 48 may be replaced by an electric coil wherein the electrical current directions are reversed for write and erase operations. Microprocessor 40 supplies control signals over line 51 to control 49 for effecting reversal between the recording and erasing magnetic directions.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the actuator control by circuits 54 is exercised by control signals travelling over lines 57 and 58 respectively for focus and fine tracking and track switching actions of fine actuator 46.

The focus and tracking position sensing is achieved by analyzing laser light from laser 67 reflected from disk 30 over path 47, thence through lens 45, through one-half mirror 60 and to be reflected by half-mirror 61 to a so-called "quad" detector 62. Quad detector 62 has four photo elements which respectively supply signals on four lines collectively denominated by numeral 63 to focus and tracking circuits 54. Quad detector 62 also includes optics such as a hemicylindrical lens for optically processing the light beam for effecting focus error detection. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high intensity laser light beam capable of heating a spot on the medium to the Curie point for recording; in contrast, for reading, the laser 67 emitted laser light beam is a much reduced intensity which does not heat the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value, depending on whether a read or write operation is occurring. Laser 67, a semiconductor laser such as a gallium arsenide diode laser, can be modulated by data signals so the emitted light beam represents the data to be recorded by such intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half-mirror 60 for being reflected toward disk 30 through lens 45. Data circuits 75 are prepared for recording the microprocessor 40 supplied suitable control signals over line 76. Microprocessor 40 in preparing circuits 75 is responding to commands for recording received from a host processor 37 via attaching circuits 38. Once data circuits 75 are prepared, data is transferred directly between host processor 37 over bus 77 into data buffer 74 and data circuits 75 through attaching circuits 38. Data circuits 75 also include ancillary circuits (not shown) relating to disk 30 format signals, error detection and correction and the like. Circuits 75, during a read or recovery detection, strip the ancillary signals from the readback signals before supplying corrected data signals over bus 77 to host processor 37 via attaching circuits 38. Data buffer 74 attached to data circuits 75 provides data buffering, as is well known for DASD's. Sector counting circuit SC 79 evaluates the number of alternate sectors 14 and 15.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the head arm 33 carried optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell (P) 82 for supplying a suitable indicating signal to differential amplifier 85.

When the reflected light was rotated by a "south" or erased pole direction remnant magnetization, then polarizer 81 passes no or very little light resulting in no active signal being supplied by photocell (P) 82. The opposite operation occurs by polarizer 83 which passes only "south" rotated laser light beam to photocell (P) 84. Photocell 84 supplies its output signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term data as used herein is intended to include any and all information-bearing signals, preferably of the digital or discrete value type. Other forms of information signal recording may be used.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS (rotational position sensing) circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. Additionally, the sensor 90 signals also travel to spindle speed control circuits 93 for controlling motor 32 to rotate spindle 31 at a constant rotational speed. Control 93 may include a crystal controlled oscillator for controlling motor 32 speed, as is well known. Microprocessor 40 supplies control signals over line 94 to control 93 in the usual manner.

Figure 3:
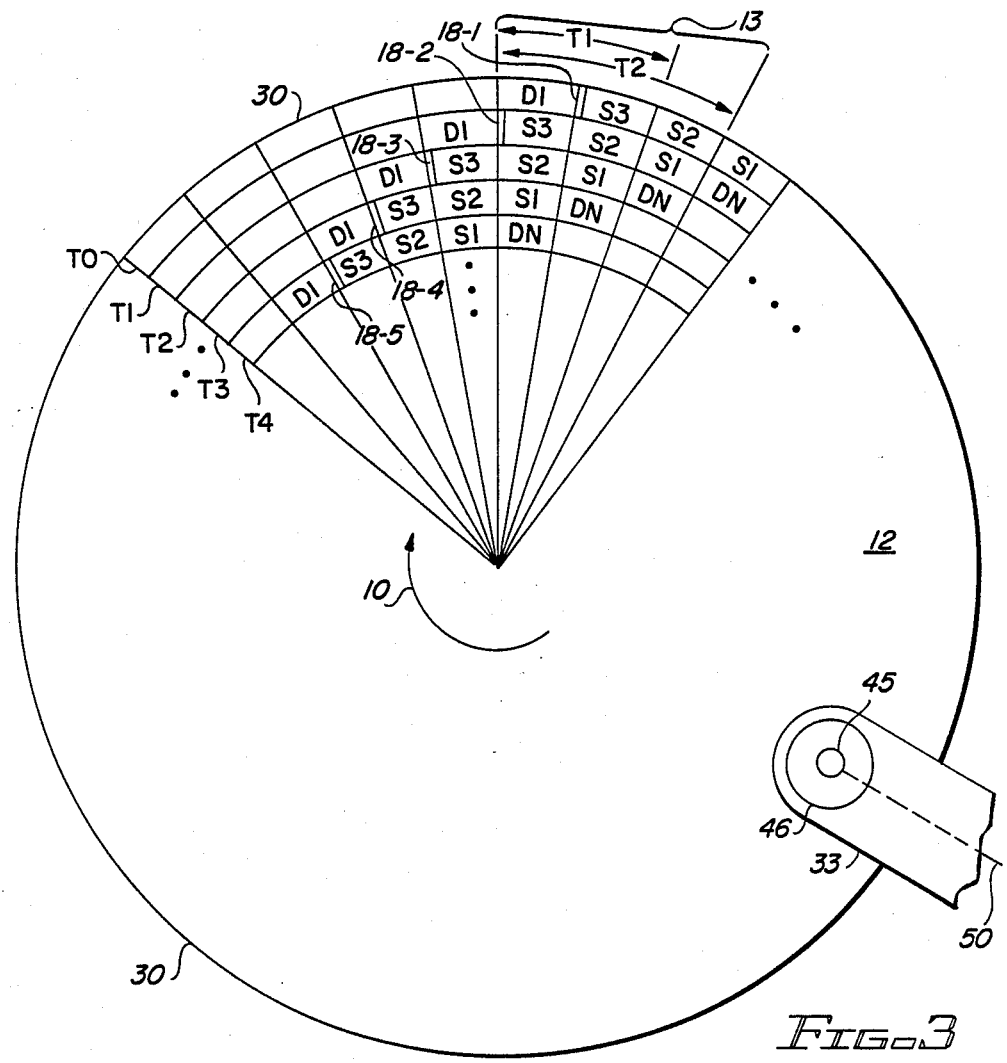
FIG. 3 is a diagrammatic plan view of a magnetooptic record disk constructed in accordance with the invention and using circumferentially offset track start positions.

Referring now to FIG. 3, a second preferred embodiment is shown wherein the beginning and end of each of the respective tracks in recording area 12 are circumferentially offset in a direction opposite to the direction of disk 30 rotation indicated by arrow 10. In this embodiment, it is assumed that most of the track jumping will be on a radially inward direction. Such a procedure is fairly similar to so-called track "creep" serial track reading as used by some DASD access support programs. Five tracks are indicated: T0–T4. Track T0 is a radially outward-most track having a circumferential index indicated at 18-1 which extends radially only for that track. Its first data sector D1 is immediately counterclockwise of index 18-1. The alternate sectors, S1–S3, are immediately "upstream" or clockwise of index 18-1. Assigned area 13 for track T0 now includes alternate sectors S2, S3 of track T0 and alternate sector S3 of track T1. The track T1 index 18-2 is displaced counterclockwise from index 18-1 by one sector. This means that the maximum track switching time or the maximum magnetic bias switching time T1 can extend from the beginning of sector S3 of track T0 and extend through alternate sector S3 of the radially inward adjacent track T1. While three alternate sectors, S1–S3, are shown for each of the tracks in FIG. 3, it is to be appreciated that one less alternate sector may be provided. Inspection of FIG. 3 shows that each of the single track indices 18-1 through 18-5 are offset counterclockwise with respect to the radially adjacent tracks. Therefore the track indices 18-1, etc. are arranged as a single spiral on the surface of disk 30.

An advantage of the arrangement shown in FIG. 3 is that a single disk may be used with a plurality of different disk recorders. For example, some of the disk recorders may rotate the disk at a first rotational speed while other lower performance devices may rotate the disk at higher rotational speed. The track jumping and magnetic bias field switching times may vary such that a greater maximum switching time is provided for certain of the diverse recorders. For example, time T2 may indicate a maximal switching time as expressed in circumferential displacement for a high performance disk drive (higher rotational speed) while T1 indicates the elapsed time in scan sectors for a lower performance drive, i.e., the disk is rotated at a slower rotational speed.

Figure 4:
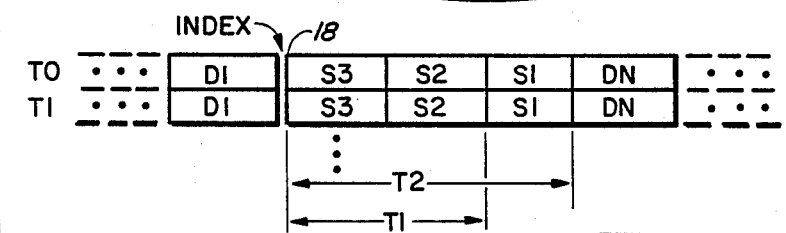
FIG. 4 is a diagrammatic showing of the relationship of alternate sectors in each of the tracks together with timing considerations with respect to such alternate sectors in accordance with a first embodiment shown in FIG. 1.

FIG. 4 illustrates two tracks, T0 and T1, from the disk shown in FIG. 1. The single index 18 extends radially across the entire recording area 12. The times T1 and T2 correspond to the times T1 and T2 shown in FIG. 3. In the case for time T2, when a first alternate sector S1 stores data, then for the drive requiring three sectors to be scanned during track jumping or magnetic bias field switching, rotational synchronization between the medium and the program execution in a host processor 37 will be lost for that track. For those media having a lower media defect rate, the arrangement in FIG. 4 may be suitable because of the lower probability of using one of the alternate sectors in any of the given record tracks. In FIG. 4, numerals D1 indicate the first data storing sector of a track which is immediately counterclockwise to index 18. Numeral DN indicates the last primary or assignable or directly addressable data storing sectors in each of the tracks which is located immediately clockwise to the three alternate sectors S1–S3

Figure 5:
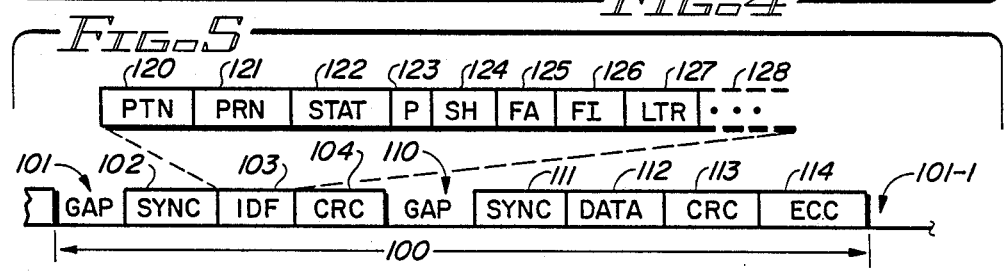
FIG. 5 diagrammatically illustrates a preferred disk sector format suitable for use with FIGS. 1 and 2 illustrated embodiments.

FIG. 5 illustrates a data format for each of the data-storing sectors in the tracks of FIGS. 1, 3 or 4. The circumferential extent of a sector is indicated by numeral 100 the onset of a sector is indicated by a signal gap 101 having a first circumferential extent. Gap 101 preferably has no information-bearing signals recorded therein (i.e., signal has been erased to a binary 0 direction or a synchronizing signal or tone is recorded). The index 18 may be indicated by a longer or embossed gap. Alternately, the gaps may be of the same length with a signal tone being recorded in the gaps for indicating sectors, indices and the like. Another alternative is to record first and second tones in the gaps and yet have gaps of different lengths. For example, the index gap could be the longest gap, the gap 101 be the second longest for indicating the onset of a individual data storing sector, etc Numeral 101-1 signifies the sector beginning gap of a sector following the illustrated sector 100. The first portion of the sector contains self-identifying recorded signals followed by a short gap 110 to indicate termination of the sector identification portion. The data storing portion follows the second gap 110. The arrangement shown in FIG. 5 is reminiscent of the format used in current fixed block architectured magnetic DASD.

Turning now to the self-identifying portion, a first field sync 102 stores clock synchronizing signals for synchronizing a readback circuit to the recorded signals in the identifying portion. The identifying portion IDF 103 (identification field) contains all of the self-identifying data as will be later described. Following IDF 103 is a cyclic redundancy check character recorded in field CRC 104. CRC 104 contains an error detecting redundancy which checks the accuracy of the recording of IDF 103. The operation of such an error detection is not described since it is so widely used.

The data portion begins with sync field 111 for synchronizing the readback circuit to the recorded signals. It should be noted that traversing gap 110 may cause some phase sync errors in the readback circuits with respect to the signals recorded. The actual user data signals are recorded in data 112 field. A second CRC field 113 contains a check redundancy for the data signals 112. The signals in data field 112 and CRC field 113 are checked and corrected by an error correction code redundancy stored in field ECC 114. ECC 114 not only enables error detection but also correction of data errors found in fields 112 and 113. The operation of such ECC's are well known and not further described for that reason.

IDF 103 includes a plurality of data containing fields. PTN 120 stores the multi-byte physical track number (PTN) of the track in which the sector resides. PRN 121 stores the physical record number the value of which is to be interpreted with other bytes in IDF 103, as will become apparent. STAT 122 is a two-bit field indicating the status and usage of the identified sector. Two bits identified as bit 0 and bit 1 (bit 0 is equal to 0) indicates that the sector is capable of storing sufficient data to the useable as an addressable sector. For a primary data storing sectors D1 through DN, PRN 121 is set to all 1's (null). When bit 0 is equal of unity, a defective sector is indicated. The numerical contents of PRN 121 point to the alternate sector used to store the data originally destined for the identified defective sector. Such alternate sector can be in the same track in the alternate sectors S1 through S3 or can be in the alternate tracks 28 as set forth above with respect to FIG. 1. When the second bit 1 of STAT 122 is equal to 0 and the sector is one of the alternate sectors S1–S3, then that alternate sector is an unassigned alternate sector. PRN 121 is then set to all 1's (null). When the second bit 1 is equal to unity, then the alternate sector has been assigned and PRN 121 identifies the defective primary sector which the identified alternate sector is replacing. P-bit 123 is interpreted whenever either of the bytes in STAT 122 are equal to unity. When P-bit 123 is 0, then the alternate sector used to store the data destined for the demarked sector has been assigned by the "push-down" algorithm, i.e., is in the same track and has been reassigned a number by the above-described and later detailed push-down algorithm. When P-bit 123 is equal to unity, then the alternate sector was assigned by using a pointer either to one of the alternate tracks 28, a sector at a time, or during a post-format write as will be detailed. Field SH 124 indicates that the IDF 103 had been circumferentially shifted in the sector, usually to avoid a defect occurring in the initial IDF 103 location When SH 124 is 0, then no shift has occurred. When SA-bit 125 is equal to unity, then the defective sector was detected during a factory operation, i.e., before the medium was shipped to the field. When FI-bit 126 is equal to unity, then the demarked or defective sector was detected after the medium was shipped to the field. These two bits are useful for analyzing shelf life and field usage characteristics of the record medium. Field LTR (logical track and record) 127 stores the address information of the logical track number of the track being scanned and a logical record number for the data being stored in an identified sector. Such logical numbers or addresses are related to programs in the host processor 37. Elipsis 128 signifies that IDF field 103 may contain additional self-identifying and control information bytes.

Figure 6:
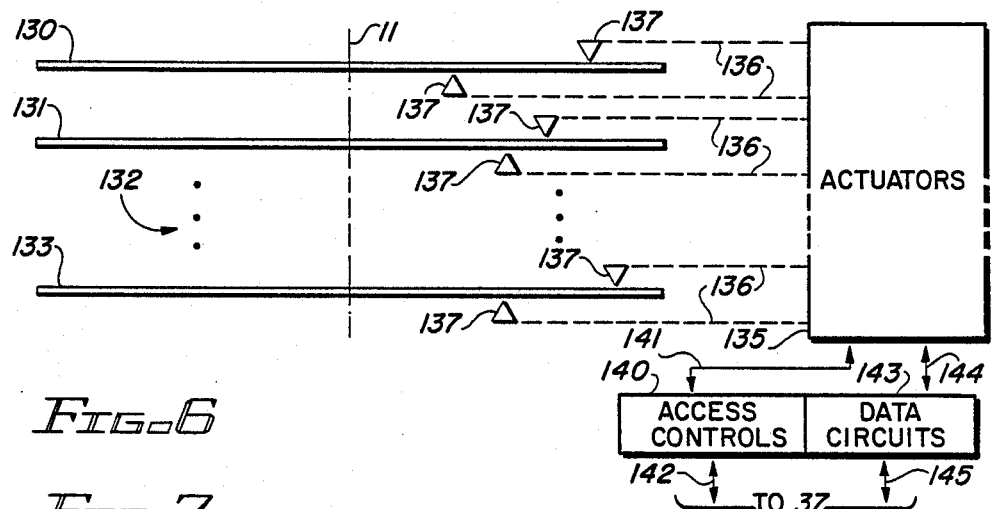
FIG. 6 illustrates a multi-disk magnetooptic spindle arrangement useable with the magnetooptic recorder shown in FIG. 2.

FIG. 6 shows a physical arrangement for the FIG. 2 recorder employing storage disks fixed on a spindle and rotatable about a common axis 11. Numerals 130 and 131–133 indicate axially displaced disks while elipsis 132 indicates additional disks disposed axially intermediate disk 131 and 133. Either of the disks 130 or 133 may be selectively removable as is known. Numeral 135 collectively indicates a plurality of head arm actuators which independently move a plurality of heads 137 along their respective facing disk recording surfaces and respectively carried by head arms collectively and diagrammatically indicated by dash lines 136. Each of the transducers or heads 137 can independently scan any track on its respective facing record surface independent of any other scanning by others of the heads. This arrangement is useful for optical disks because of extremely large data storage capacity on each surface of the disk. Alternately, the head pairs between facing surfaces of adjacent disks can be on a common head actuator arm.

The data flow between the various disk surfaces of disk 130–133 and host processors 37 is handled by data circuits 143 connected by one or more bidirectional data buses 145 to host processors 37. Similarly, one or more bidirectional data buses 144 are coupled through actuator mounts to the respective heads 137. That is, data circuits 143 may contain more than one data flow path. For example, one data flow path per each of the transducers 137 may be used. Access control 140 controls all the actuators 135 on an independent basis, one actuator control circuit for each of the actuators. Bidirectional buses 141 carry the status and control signals between access control 140 and actuators 135. Bidirectional bus 142 connects access control 140 to host processors 37 for exchanging status signals and seek signals for the respective actuators 135. The described arrangements provides for extremely high performance and is useful in connection with practicing the present invention. Because of the high performance enabled through the practice of the invention, each of the disk surfaces can be separately addressable data storing volumes, i.e., appear as independent devices to the host processors 37.

Figure 7:
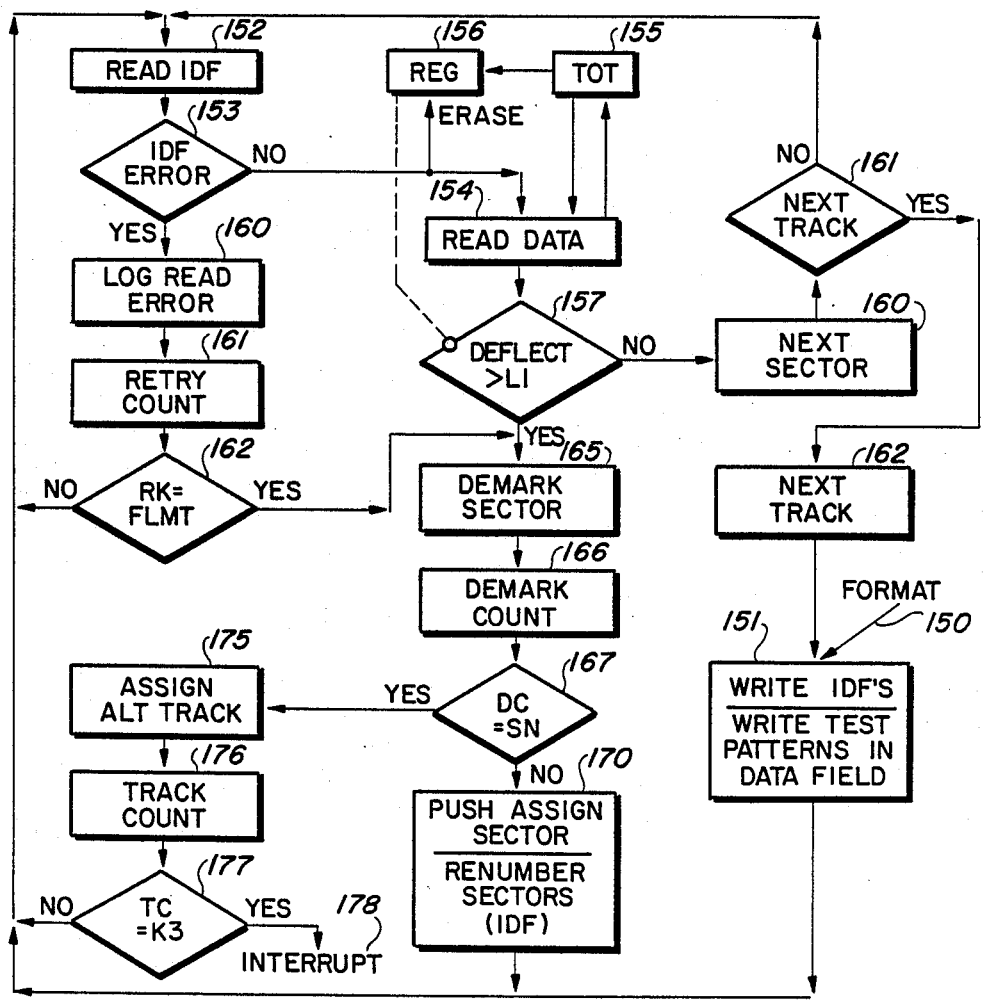
FIG. 7 is a machine operations chart for the FIG. 2 illustrated recorder relating to the formatting of a magnetooptic disk in accordance with the present invention.

FIG. 7 illustrates, in flow chart form, the machine operations conducted by the FIG. 2 illustrated recorder for factory formatting a disk 30. Such formatting includes the initial assignment of alternate sectors. The FA-bit 125 is to be set to unity for indicating a factory detected format. The machine operations of FIG. 7 can be conducted by the FIG. 2 illustrated recorder or by other machines of more specific design for implementing formatting within a manufacturing plant. In any event, formatting operations are initiated as indicated by numeral 150. The first machine operation at step 151 records control information signals on disk 30, in particular the sector identification fields 102, 103 and 104 (FIG. 5) are recorded followed by recording the data fields 111–114. The user data field 112 receives write test patterns with corresponding error detection and correction redundancies in CRC and ECC fields 113, 114. Such test patterns are read back using higher signal clip levels or shorter detection windows for stressing the sync field, mark and data detection for verifying disk operation under degraded or adverse operating conditions. Such test patterns are known in the field and are not described for that reason. The formatting begins at the radially outward-most track of data recording area 12. It is assumed that each of the tracks in recording area 12 are identifiable by a form of track servo indicia in disk 30. As an example, one form of such indicia consists of grooves and lands molded or otherwise formed into the recording surface of disk 30. Such grooves and lands enable tracking on the transitional walls between the grooves and lands, as is known. Other forms of servo indications are also contemplated such as di-byte or tri-byte patterns as used on current magnetic DASD's rather than magnetic recording. Such di-byte and tri-byte patterns may be optically embossed onto the surface of a disk 30. Of course, yet other forms of track-indicating indicia may be employed. Following step 151 which recorded the IDF's and test patterns, in all of the sectors, including the alternate sectors in the radially outward-most track, then at step 152 the IDF field 123 written in sector D1 of the radially outward-most track is read. While traversing gap 110 of sector D1, microprocessor 40 calculates the comparison of CRC 104 redundancy and the informational content of IDF 103. Assuming that CRC 104 redundancy indicates no IDF error, then machine operations proceed to step 154 which reads the recorded test patterns in the data field of sector D1. The read data step 154 is performed to indicate the lengths of media defects in the portion of sector D1 assigned for recording field 111–114. A register 156 stores the measured elapsed times showing the lengths of defects detected during the read 154 operation. Time-out timer TOT 155 measures the elapsed time. For example, during reading when a defect is encountered, TOT 155 is initiated. When the end of the defect is detected, then the elapsed time, which is indication of the defect length is stored in register 156 and TOT 155 is reset. When a plurality of defects are detected, then register 156 will store the greatest elapsed time, i.e., identification of the longest defect within the sector. The machine operations for storing the greatest number is well known and not described for that reason. Additionally, TOT 155 can have programmed into its operation an acceptable maximal defect length L1. If a maximal defect length is detected, the read data operation 154 may be dispensed with, but with the register 156 storing the maximal number corresponding to a number just greater than L1. In any event, upon completion of the read data step 154, whether completed or interrupted, at step 157 the numerical contents of register 156 are compared with the defect threshold time value L1. When the disk is being formatted for fixed block recording or interleaved ECC recording, code word correctability rather than just measured defect lengths, determines disk acceptability. The number of recorded symbols in error per code word is an important metric in measuring media acceptability. In such environments, media acceptability is a function of not reaching a maximum number of symbols in error per code word. Such analysis must also accommodate defects arising after formatting. Such analysis is beyond the scope of the present description.

Assuming that no defect greater than L1 was detected, then the next sector located counterclockwise or the next track which is the next inwardly-most track will be processed.

At step 160, the next sector is identified. For example, as sector D2 which is the next sector circumferentially adjacent to sector D1. At step 161, microprocessor 40 determines whether or not the last sector scanned was the last sector of the track immediately clockwise of index 18. If the next track has to be accessed, then at step 162 the objective lens 45 is moved radially inward one track. At this time it should be noted that one rotation of the disk is required for establishing rotational synchronization between the disk and the formatting program in microprocessor 40. Alternatively, roll-mode techniques as described in the Hartung patent, supra, may be employed. Upon completion of identifying the next sector, steps 152 through 157 are repeated for each successively scanned and analyzed sector. Completion of formatting a track requires accessing the next track at step 162 followed by steps 151-157, as described. The above description assumes that no errors have occurred in the formatting.

In the event an error is detected using CRC 104 for the IDF area, then microprocessor 40 and machine operation step 160 logs the read error and retries reading the IDF fields 102–104 of the sector being analyzed. Microprocessor 40 in step 161 adds one to a retry count, i.e., there may be a read error and it would not be necessary to demark a sector because of one read error. In machine operation step 162, microprocessor 40 determines when the retry count RK is greater than or less than the format limit count FLMT. If RK is less than the format limit count, then steps 152, etc. are re-executed for the next sector. It should be appreciated that the re-execution of these steps is on the next rotation of disk 30. In the event that RK equals a format limit count at step 162, then the sector being processed or formatted is demarked at machine operation step 165. Demarking the sector is achieved by making the first bit 0 of STAT 122 equal to unity. The demarking operation later described sets LTR 127 to point to a logical sector which replaces the defective sector as well as the P-bit 123 indicating whether the alternate is push or pointer assigned. Following the demarking, microprocessor 40 at machine operation step 166 indicates the number of sectors demarked for the instant track. That demark count DC at step 167 is compared with the maximal sector number SN for permitting a successful formatting of a track in which the sector resides. Assuming that the demark count is less than the limit SN, then microprocessor 40 at step 170 push assigns a sector to replace the demarked sector. Logically this will be the next sector circumferentially adjacent the sector being demarked. The sectors are then renumbered in the IDF field to be physically circumferentially displaced from their original assigned position by one sector length.

Also within step 170, the P-bit is set to 0, the SA-bit 125 is set to unity and LTR field 127 is set to indicate where the alternate sector resides in the logical assignment of sectors on disk 30. It should be noted that step 170 includes recording signals on the disk 30 including recording different IDF information in the "downstream" sectors within the track being formatted. Following step 170, step 152 et seq are repeated for the next circumferentially adjacent sector.

In the event at step 167 the demark count equals the limit for defective sectors in a factory-formattable disk 30, then an alternate track is assigned and the entire track is demarked with the assigned alternate track being identified in the IDF's of all sectors in the defective track. At step 175, the alternate track is assigned. Its alternate track such as track 12b will be in the radially inward-most portion of disk 30. Formatting of alternate tracks proceeds radially outward. At step 176, a defective track count TC is incremented by unity for determining whether or not the disk 30 should be shipped to the field. At step 177, microprocessor 40 compares the current defective track count TC with a constant K3. When the defective track count equals the constant, a predetermined limit for a number of defective tracks has been reached and, accordingly, the formatting operation is interrupted as indicated by numeral 178. Recovery procedures for trying to validate the defective disk 30 for being shippable is beyond the scope of the present description. Assuming that TC is less than K3, then steps 151-157 are performed for the assigned alternate track, i.e., the alternate track is now formatted and processed as described for the tracks that are addressable directly by host processor 37. Alternately, the next radially adjacent track can be selected as on alternate track during factory or initial formatting. The track addresses of other tracks are then adjusted as described for sectors being reassigned.

When a sector is being demarked, it still must successfully record the sector identification field consisting of fields 102-104. When an error is found in the portion of the sector receiving the field 102-104, then the recording during the demark sector step 165 circumferentially shifts the field 102-104 downstream within the sector. When such shifting occurs, then SH-bit 124 is set to unity to indicate that the IDF field has been shifted within the sector. The IDF fields can be repeated throughout the sector which requires that the FIG. 2 illustrated recorder read IDF fields until a successful one is encountered. By shifting the IDF field, such rereading and complication is avoided. In the event of shifting the IDF field, gap 101 becomes extremely long and can be used by the FIG. 2 illustrated recorder for detecting whether or not SH-bit 124 should be set to unity. The importance of recording the sector identification field on a demarked sector is to access a pointer to the alternate sector and for determining whether that alternate was assigned by the push or pointer algorithm. The demark counts DC can be stored in SC 79 of FIG. 2.

The above-described formatting operations are repeated for each and every sector in disk 30 until all of the sectors on the disk have either been demarked or formatted including the alternate sectors as found in track 12b and in circumferential area 13.

Figure 8:
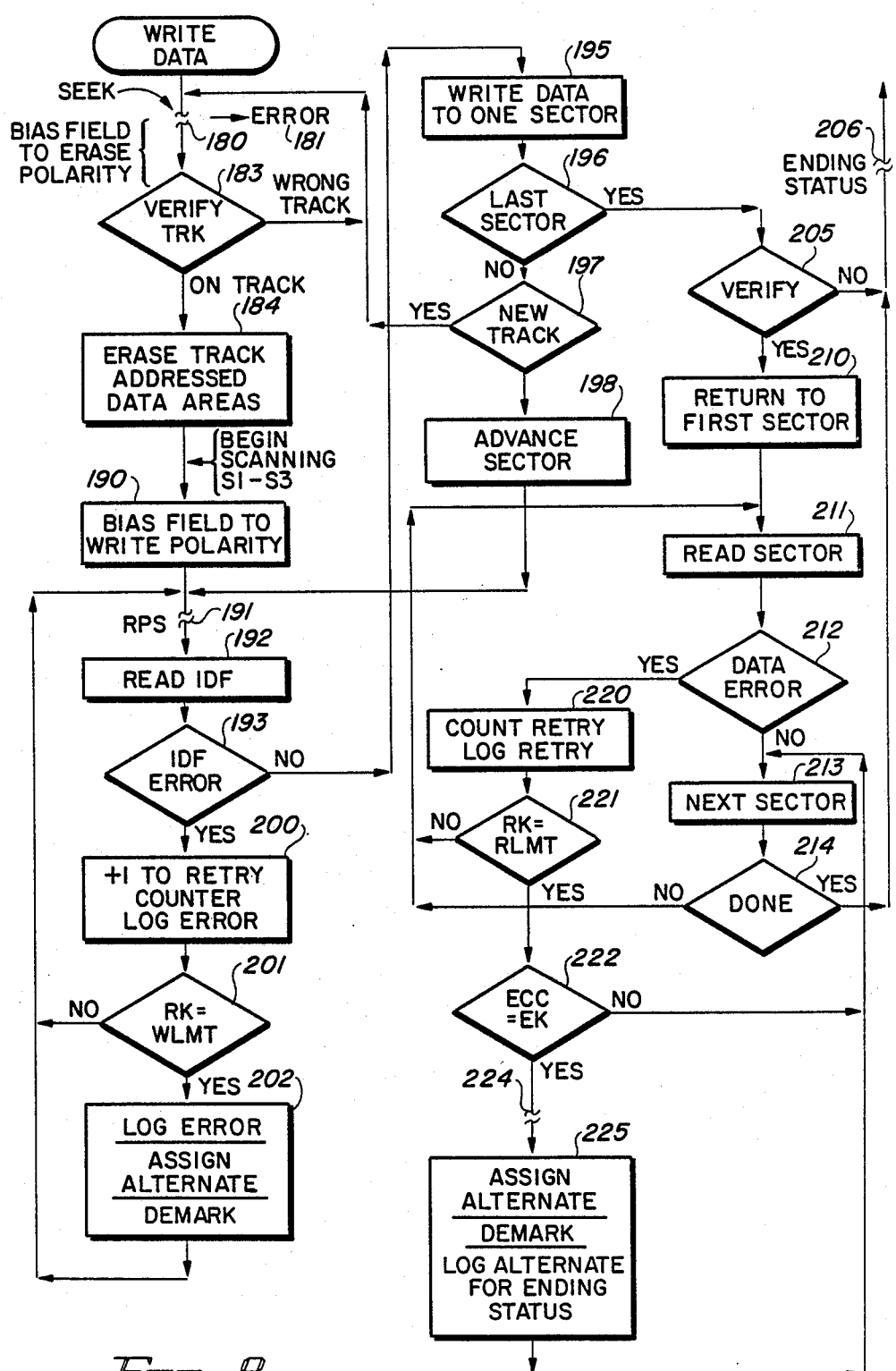
FIG. 8 is a machine operations chart for the FIG. 2 illustrated recorder for recording on a magnetooptic disk after the disk has been formatted in accordance with the FIG. 7 illustrated machine operations.

Referring next to FIG. 8, a data recording set of machine operations is described for either a single or multiple track record. The description assumes that the connected host processor 37 has issued a data write (recording) command to the FIG. 2 illustrated recorder. Such commands are structured similarly to that used in present day DASD and include not only the the addresses of the sectors to be written, but also the number of sectors and other ancillary information. First, the recorder must determine whether or not the current location of the objective lens 45 is scanning the addressed track. This action is usually proceeded by a seek operation where seeking to the track is indicated by numeral 180. If there is an error in the seek operation, then that error is reported as indicated by numeral 181. During such seek, the magnetic bias field represented by magnet 48 is switched to the erasing polarity as indicated by numeral 182. Microprocessor 40 at step 183 verifies that the address received with the write command from host processor 37 is the same address as the track currently being scanned by the beam from objective lens 45. If this track is the wrong tack, then the recorder causes the objective lens to be moved to the address track by repeating step 180. When microprocessor 40 verifies that the light beam from objective lens 45 is scanning the addressed track, then the sectors to be written to are erased at machine operation step 184. Here different procedures may be employed. In some systems it may be desired to write an entire track at a time. In such case, the entire addressed data areas 111-114 within the track are erased in preparation for magnetooptic recording. This erasure includes all of the directly addressable data areas of sectors D1-DN and any of the assigned alternate sectors S1-S3. If an alternate sector has not been assigned, there is no need to erase it. It should be noted that step 184 includes reading the sector identification fields 102-104 of the sectors in the track to be written to. Based upon the informational contents of fields 102-104 and the commands from host processor 37, the data portion of the sector including fields 111-114 are selectively erased. Upon completion of erasure, which is normally the onset of scanning the alternate sectors in area 13, microprocessor 40 commands control 49 at step 190 to reverse the bias field polarity to the write polarity from the erased polarity. Rotational position synchronization (RPS) is then checked at step 191. Assuming that rotational position synchronization has been maintained, step 192 of reading the sector identification fields 102-104 is performed. Otherwise, a complete rotation of disk 30 is required before step 192 is performed. Following the reading of IDF 103 and CRC 104, the correctness of the reading is determined. This check is a part of step 192. Then at step 193, whether or not the IDF field 103 is an error is checked. Assuming no error, then at machine operation step 195, microprocessor 40 causes the recorder as shown in FIG. 2 to write data in the data area of the sector, i.e., records fields 111-114. At step 196, microprocessor 40 determines whether or not the just written sector is the last sector to be written in the execution of the host processor 37 supplied write command. If not, at step 197 microprocessor 40 determines whether or not the sector just written is the last sector in the track currently being scanned. If it is the last sector in the track, then a track jump or seek is performed to the next radially inward (or outward) track as indicated by numeral 180 with those steps being repeated until the next track is set up for recording. If, at step 197, recording is to continue on the current track, then the next sector is identified by microprocessor 40 at step 198 to store data received from host processor 37 and currently stored in buffer 74. Then steps 191 through 197 are repeated.

In the event at step 193 an error is detected in IDF field 103, for the purposes of data integrity, it is desired not to record in that sector because of the possibility of recording the data in the wrong sector which makes it unaddressable or unaccessible or unintentionally obliterates unaddressed data. Therefore, when an IDF error is detected at step 193, microprocessor 40 adds one to a retry counter (not shown) in machine operation step 200. Then at step 201, the retry count RK is compared to the WLMT write limit threshold. If the retry count is less than the write limit, steps 191 through 193 are repeated to see if a successful read of the IDF field 103 can be achieved. Each retry, of course, requires an additional rotation of disk 30. Whenever the retry count equals the write limit, then microprocessor 40 logs the retry errors as permanent errors, assigns one of the alternate sectors and demarks the current sector. Demarking generally follows the procedures set forth in FIG. 7 as does the assigned alternate sector. Upon completion of the logging and recording of errors to host processor 37 in step 202, the data is written to the assigned alternate. The IDF field 103 of the assigned alternate is then read at step 192 wherein the other described steps being repeated for that alternate sector. Upon completion of writing to the assigned alternate sector, microprocessor 40 returns to the sequence of the sectors D1-DN for continuing the recording operation as commanded by host processor 37. A similar procedure is followed in DASD magnetic recorders and is not detailed any further for that reason.

When the FIG. 2 illustrated recorder completes the commanded write operation, microprocessor 40 at step 205 checks the received write command to determine whether or not the just recorded data should be verified as being successfully recorded. If no verification is desired, then ending status is sent to the host processor as indicated by numeral 206. Reporting ending status is a procedure well known in the data processing art.

In the event verification is required by host processor 37, then microprocessor 40 at step 210 causes the recorder to move the objective lens 45 for scanning the first sector recorded during the write operation. At step 211, the FIG. 2 illustrated recorder reads (at a higher than normal clip level or using shorter than normal detection window) the first sector. If a data error is detected at step 212 during the read as by the data circuits 75, a read retry is attempted as set forth below. Without a data error, the next sector to be read is assigned by microprocessor 40 at step 213. This next sector assignment is checked at step 214 to determine whether or not all of the recording has been verified. If the recording has been verified, then ending status is reported at 206. Otherwise, steps 211 et seq are repeated for each ensuing sector. In the event a data error is detected by microprocessor 40 at step 212, a retry count (set to zero on verify operation) and the error is logged at step 220. Then microprocessor 40 at step 221 compares the read retry count RK with the read limit tries RLMT for the verify operation. If that limit is not reached, then the steps 211 et seq are repeated for obtaining a successful verification, i.e., it is desired to leave some error conditions on the disk when the disk can be successfully read using the error correcting capabilities of the ECC capabilities of redundancy stored in ECC 114. In the rare event that the read limit is reached on the retries, microprocessor 40 at step 222 determines whether or not the error count EK is satisfactory for allowing the recording to be left in the sector, i.e., prevent rerecording. For example, if an error correction code is capable of detecting three errors and correcting two errors, then the occurrence of a single error in data field 112, which also could be a data error in field 113 and 114, then a recording with one error may be satisfactory. If such is the situation, then steps 213 et seq are repeated for verifying the next sector. If, however, the number of errors in the data fields 112-114 equals the threshold of the error correcting capacity, then additional error logging is performed as indicated by numeral 224. Then at step 225, an alternate sector is assigned by either the push or pointer algorithm as above described, the current sector is demarked and the alternate is logged for ending status. The data recorded in the defective sector has to be rerecorded into the assigned alternate by an ensuing write command from host processor 37. Upon completion of the verification, all of the demarked sectors are identified in the error log (not shown) of microprocessor 40. At ending status for the verification operation, such demarking is reported to host processor 37. Host processor 37 then determines which of the data commanded to be written was not successfully written on disk 30. Host processor 37 causes a new write command to be issued to the FIG. 2 illustrated recorder for rerecording the data intended for the just demarked sectors which results in recording the data in the newly assigned alternate sectors. In an alternative procedure, as soon as the recorder of FIG. 2 detects a sector which was not successfully recorded, the recorder then can immediately request host processor 37 to return the data to the recorder for storage in buffer 75 Then the data recorder can record just that single sector using the steps 180 et seq of FIG. 8 as above described. If preferred that all of the sectors be demarked with host processor 37 intervention being limited to a single re-write command.

Figure 9:
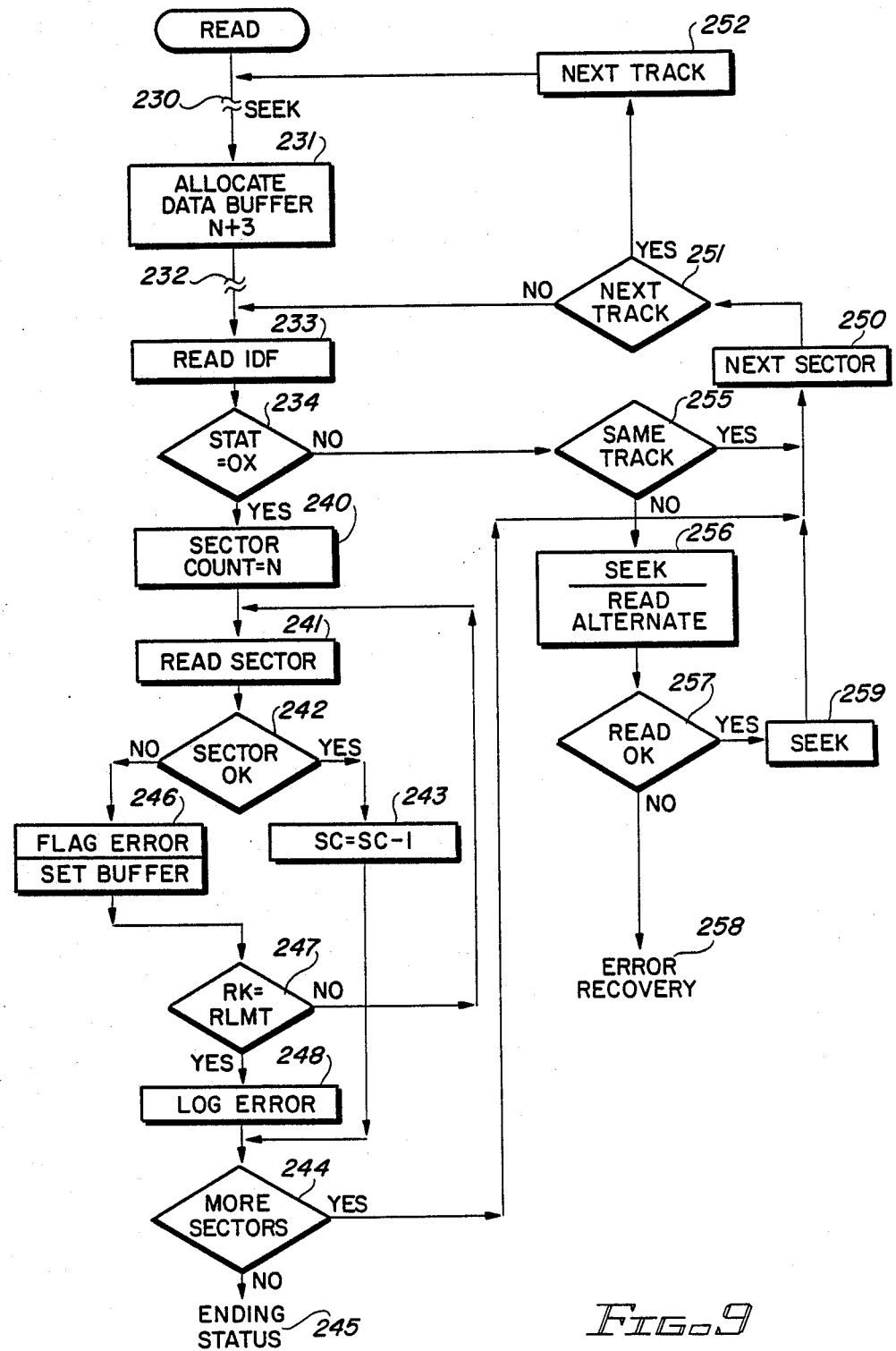
FIG. 9 is a machine operations chart illustrating readback operations for the magnetooptic recorder shown in FIG. 2.

FIG. 9 illustrates a readback operation of the FIG. 2 illustrated recorder in response to a read command received from a host processor 37. The read command can include either a single track or multi-track read. Seeking to the track to be read is indicated by numeral 230. The seek is verified as indicated in FIG. 8 for the recording operation. At machine operation step 231, storage space is allocated within data buffer 74, for storing the informational contents of the track(s) to be read, including the alternate tracks. That is, the image of information-bearing signals stored in the buffer reflect the addressed physical locations of the data storage on disk 30. The control information stored in IDF field 103 may also be stored with the data for data integrity and verification purposes. Other machine operations not pertinent to an understanding of the present invention may be performed as indicated by numeral 232. At step 233, IDF field 103 of the first addressed sector is read. At step 234, microprocessor 40 examines the informational content of STAT field 122. If the first bit 0 is equal to 0, then the sector is good and can be read. If the first bit 0 is equal to 1, the sector is defective and the alternate sector is, as later described. At step 240, the sector count is incremented to reflect the number of sectors that have been read. At step 241, the data portion of the sector is read following the IDF read operation. Microprocessor 40 at step 242 detects whether or not an uncorrectable data error has occurred in the readback of data field 112. If there is no uncorrected data error, then at step 243 the sector count SC 79 is reduced by unity indicating the number of sectors yet to be read. Then at step 244, microprocessor 40 determines if additional sectors are to be read. If no, then ending status is given as indicated by numeral 245. If yes, then a next addressed sector is accessed, as will be described.

Returning now to step 242, if an uncorrected error results from reading data field 112, then the error is flagged at step 246. Also in step 246, a retry count is incremented by unity. At step 247, microprocessor 40 compares a just incremented retry count RK to the read limit RLMT. If the retry count is less than the permitted read limit, then steps 241 et seq are repeated for attempting a successful read. Whenever a read count limit equals the limit, then the read is unsuccessful and a permanent error has occurred. The permanent error is logged at 248 and the read may continue for getting as much data to host processor 37 as possible. The uncorrected data still resides in data buffer 74, but with the permanent error logged at 248, host processor 37 will be notified that the data stored in that portion of data buffer 74 corresponding to the just read sector contains an uncorrected error. Host processor 37 then can proceed through recovery procedures beyond the scope of the present description in order to compensate or accommodate such uncorrected error.

Returning to step 234, whenever bit 0 of STAT field 122 is unity, the sector to be read has been previously demarked. The IDF field 103 has been read into the data buffer 74. At step 255, microprocessor 40 determines from LTR 127 whether or not the assigned alternate sector for the just read sector is in the same track or in one of the alternate tracks 28, such as track 12B. If it is within the same track, the next sector is assigned at step 250 as being the alternate sector. Then at step 251, the next track is not yet to be accessed, therefore, step 233 is repeated for reading the first IDF of the alternate sector. Upon successful completion of the reading of the alternate sector by machine operation steps 240 through 244, then more previous sectors of the addressed track are to be read. Then at step 250, microprocessor 40, having remembered that the alternate sector was read, assigns the next sector in the sequence of sectors (D1–DN) to be read. In another embodiment, all sectors of a track are read and stored in a buffer. Then the demarked sectors are restored by data read from an assigned spare sector to reconstitute the recorded data for the host processor. If this next sector is in the next track as detected at step 251, then the next track is accessed as indicated by numeral 252. Then the read continues on the next track after the track jump or seek at numeral 230.

On the other hand, if the alternate sector for the defective sector is not in the same track, then from step 255 microprocessor 40 causes the recorder of FIG. 2 to seek at step 256 to the alternate track. The alternate track is then read. If the alternate sector has a successful read as detected at step 257, then at step 259 microprocessor 40 causes the recorder of FIG. 2 to return the objective lens 45 to the track originally being scanned for continuing the read operation. The next sector is then assigned at step 250 as previously described. On the other hand, if the alternate sector is not successfully read, then further error recovery procedures may be provided as indicated by step 258. Such recovery can include read retries followed by the step 248 of logging the permanent error, if necessary, and indicating to host processor 37 that the data stored in data buffer 74 from the alternate sector is uncorrected data. In this regard, whenever the seek and reading of the alternate at track 256 is performed, it shall include an allocation of data storage space in data buffer 74 in addition to data buffer allocations set up in step 231 for the primary sectors.

While the invention has been particularly shown and described with reference to preferred embodiments thereof, it will be understood by those skilled in the art that various changes in form and details may be made therein without departing from the spirit and scope of the invention.

What is claimed is:

1. A magnetooptical record disk having a plurality of radially spaced record tracks, the record disk being adapted to be operated with a magnetooptical recorder having a magnetic biasing unit capable of switching magnetic biasing field directions or performing a single track step within a first predetermined elapsed time and the recorder being operable to rotate the magnetooptical record disk at a given angular speed past a magnetooptical transducer;

the improved article including, in combination:

each of the record tracks being circumferentially divided only into a first plurality of equal capacity circumferentially extending user data storing sectors, each sector including unique self-identifying initial data and a data storing space for storing user data.

each of said record tracks having a track start user data storing sector;

in each of said record tracks, a given plurality of said data storing sectors being alternate sectors and being disposed immediately adjacent said track start sector for storing user data destined for other ones of said user data storing sectors of such each track whenever said other ones of said user data storing sectors is incapable of storing data; and said given plurality being at least one greater than the number of sectors passing said transducer during said first predetermined elapsed time.

2. The article set forth in claim 1 wherein the format is to accommodate disk recorders which rotate disks at different angular speeds;

the improved article further including, in combination:

said track start sectors in radially adjacent ones of said tracks being circumferentially displaced a given circumferential distance representative of relative diverse rotational speeds of diverse ones of said recorders such that said given plurality of alternate sectors provide for said first predetermined elapsed time to occur between such radially adjacent tracks when measured from a predetermined one of said alternate sectors in one of said tracks to said track start sector in a track immediately radially adjacent said one track.

3. The article set forth in claim 1 wherein scanning time of said given plurality of alternate sectors is less than elapsed time required for a recorder adapted to operate with the article to switch from scanning one of the tracks to scanning an immediately radially adjacent one of the tracks such that when scanning the second track, the track address can be determined from said track starting sector prior to scanning the data storing space of said track starting sector.

4. The article set forth in claim 1 wherein said track starting sectors are circumferentially offset from each other in the adjacent ones of said record tracks such that the track starting sectors form a single spiral of such track starting sectors on said record member.

5. The article set forth in claim 1 further including:

a multi-track record stored on said article as a single cluster of said data storing sectors with the cluster including only those data storing sectors other than said alternate sectors in the respective tracks such that physical track addressing is enhanced while permitting alternate storage of data destined for ones of said data storing sectors incapable of storing data are provided by the alternate sectors in the same track.

6. The article set forth in claim 5 wherein said article has a media defect rate such that about up to 30% of said record tracks have at least one of said incapable data storing sectors.

7. In a method of operating a recorder having a rotating disk-shaped record member, means in the recorder for accessing any one of a large plurality of record tracks disposed on the record member, each of the record tracks being divided only into a first plurality of equal data storing capacity circumferentially extending user data storing sectors, the recorder having a predetermined first elapsed time for accessing one track from an immediately radially adjacent second track and wherein the recorder is adapted to receive and record a plurality of records containing sufficient data signals which are greater than the data storing capacity of a one of said record tracks;

the improvement including the steps of:

designating a first one of said sectors in each of the respective record tracks as a track starting sector;

rotating the record disk at a predetermined rotational speed such that the elapsed time for scanning each of said sectors is equal to each of said record tracks and rotating the disk in a first angular direction;

in each of said record tracks, designating a first plurality of said record sectors in the respective tracks as alternate sectors for receiving data destined for other ones of said data storing sectors in the same respective track and locating said first plurality of alternate sectors immediately adjacent said first data storing sector in a circumferential direction opposite said first angular direction of rotation;

selecting said first plurality of said alternate sectors such that the scanning time of said first plurality of alternate sectors is not less than the elapsed time for the recorder to access said second one of said tracks from said one track;

when recording or reading a multi-track record accessing only said other ones of said data storing sectors in each of the record tracks storing the multi-track record and switching the scanning from one track to said second track while scanning said alternate sectors;

monitoring the operation of the recorder with respect to all of the data storing sectors being scanned for detecting media defects which prevent the recording of predetermined amount of data in any one of said data sectors being scanned; and when recording data to the record member, moving the data destined for one of said other data storing sectors which is detected as being incapable of storing data to one of said alternate sectors and indicating in said incapable sector that data destined for such sector is stored in another sector within the same track.

8. The method set forth in claim 7 further including the steps of:

accessing said data storing sectors for transferring signals stored thereon to the recorder including scanning said other sectors in predetermined ones of said record tracks for reading data signals therefrom;

monitoring the reading of the data storing sectors for detecting an indicated one of said data storing sectors; and upon detecting an indicated one of said data storing sectors accessing another of said data storing sectors including an alternate one of said data storing sectors for substituting data stored in one of said alternate sectors for a one of said other data storing sectors in said same track.

9. The method set forth in claim 7 further including the steps of:

selecting said record disk to be a magnetooptically recorded disk;

selecting a predetermined ones of said other data storing sectors for receiving data to be recorded;

erasing the data from said selected record sectors during a first rotation of said disk;

scanning said alternate sectors while maintaining scanning of the sectors in the same track;

reversing a magnetic biasing field from an erasure direction to a recording direction while scanning said alternate sectors; and recording the data in said other sectors on the second rotation of said disk including said monitoring steps and recording data intended for one of said other of said record sectors in a one of said alternate sectors when the monitoring indicates any one of said other data storing sectors in this track being scanned is incapable of storing data.

10. The method set forth in claim 9 further including the steps of:

initially formatting the magnetooptic record disk for identifying ones of said record sectors being defective;

upon detecting a defective one of said record sectors in any track indicating that such defective sector is defective and reassigning the sector numbers of the defective sectors and all subsequent ones of said other sectors in the track being scanned to the next successfully scanned sector such that a last scanned one of said other sectors is assigned to a first scanned one of said alternate sectors;

after said initialization, recording data on said record disk including said monitoring steps; and upon detecting a sector not previously indicated as being defective as being defective, indicating such newly detected sector as being defective and recording a pointer in such defective sector pointing to the one of said alternate sectors for storing data destined for such last detected record sector.

11. The method set forth in claim 7 further including the steps of:

designating a small predetermined number of said record tracks as alternate tracks; and when all of the alternate sectors in any of said given tracks have received data from defective ones of said other sectors in such record track then assigning a sector of said alternate tracks to receive data from such one track.

12. In a method of recording data onto a record disk, the record disk containing a large plurality of substantially concentric record tracks, each of the record tracks being circumferentially divided into a first plurality of equal capacity circumferentially extending record sectors; the method including the steps of:

designating in each of said record tracks a first one of said sectors as a starting sector;

rotating the record disk in a first rotational sense at a predetermined rotational speed;

reserving a small first plurality of said record sectors as alternate sectors for storing data not storable in predetermined ones of the sectors in such track having alternate sectors and in each track designating said record sectors other than said first plurality of sectors as being primary sectors;

establishing addressability for all of the primary sectors on said record disk except for a small number of said record tracks;

recording data signals onto addressed ones of said record tracks including monitoring the recording operation for detecting defective ones of said primary record sectors;

upon detecting a defective one of said primary sectors recording the data destined for such defective primary sector into one of said first plurality of sectors within the same track until all of said alternate sectors in given rack have received data from defective ones of said primary sectors in the same track;

upon filling all of the alternate sectors in any one of said tracks using said excepted small number of record tracks as alternate data storage areas;

establishing an elapsed time for changing scanning of one track to scanning an adjacent track; and selecting said first plurality of sectors to be a number which requires an elapsed scanning time not less than said elapsed time for switching the tracks.

13. The method set forth in claim 12 further including the steps of:

selecting a record disk having a defect rate wherein the probability of using a one of said first plurality of record sectors in each and every one of said plurality of record tracks approaches not less than 30% of the record tracks; and selecting said first plurality to be a number of said record sectors to be at least one greater than the number of said record sectors to be scanned during the elapsed time of switching scanning from one track to an adjacent track.

14. The method set forth in claim 13 further including the steps of:

circumferentially positioning said start track sectors in a circumferential offset to form a single spiral on the record disk and selecting the offset to be equal to a small number of said record sector; and making the offset spiral of track start sectors to be radially inward in a rotational sense opposite to the rotational sense of disk rotation.

15. The method set forth in claim 14 further including the step of:

upon detecting a one of said primary record sectors as being defective using a push-down algorithm to reassign data destined for the defective sector to subsequently scan ones in the same record track including selecting an additional one of said first plurality of sectors for receiving data from a one of the primary sectors and logically reassigning sector numbers to subsequently scan ones of said sectors in the same track;

when recording signals on the record disk or in detecting a one of said primary sectors as being defective and subsequent ones of said primary sectors already are storing data then storing a pointer in the defective one of said sectors pointing to a one of said alternate sectors in said first plurality of sectors in the same track; and detecting a one of said primary sectors to be defective when all of said first plurality of alternate sectors have received data, then selecting a second one of said record tracks to receive data from the last detected one of said defective primary sectors.

16. A recorder for recording signals onto and reading recorded signals from a rotating record disk including a transducer for scanning record tracks on the record disk, wherein each record track is divided only into a given plurality of like data storing capacity circumferentially extending sectors, means for moving the transducer radially of the disk for accessing any one of the large plurality of record tracks on the record disk, means for rotating the record disk in a first rotational sense, means on the disk designating in each of said record tracks a one of said record sectors as a track starting sector;

the improvement including in combination;

a microprocessor in the recorder having the computer program storing unit, data circuits connected to the transducer and to the microprocessor for recording signals onto the record medium through the transducer and for reading signals recorded on the record disk through the transducer, all under control of the microprocessor;

addressing indicia in said program unit for being sensed by the microprocessor for causing the microprocessor to operate the recorder to access predetermined primary ones of said record sectors in any of said record tracks the number of said primary record sectors in each of said record tracks being less than the total number of record sectors with the remaining recorded sectors in each track being designated as a set of said alternate sectors the alternate ones of said record sectors in each of said record tracks being circumferentially disposed immediately adjacent to said track starting record sector in a rotational sense opposite to the rotational sense of rotation of the disk and the number of said alternate sectors being sufficient to require an elapsed scan equal to or greater than the elapsed time for the recorder to move the transducer from one of said record tracks being scanned to an adjacent one of said record tracks being scanned such that when the transducer reaches the adjacent one of said record tracks that a track starting record sector in the adjacent track will be scanned as a first primary record sector to be scanned;

read sector indicia in said program unit for being sensed by the microprocessor such that the microprocessor operates the recorder to read signals stored in a one of said primary record sectors, the read indicia including indicia for a reading in an addressed one of said primary sectors an identification portion of the sector further indicia in the read indicia for causing the microprocessor to monitor for read errors, upon detecting a read error retrying reading the identification portion a predetermined number of times, then to abort the read operation;

data processing indicia in said read indicia for causing the microprocessor to respond to the identification signals read from the identification portion to perform a data processing operation with respect to a data storing space in the sector, further indicia in the read indicia indicating that the address primary sector is defective, then causing the microprocessor to operate the recorder to read another sector in the same track for performing said data processing operation with respect to said another sector;

repeating the above-described operation for a plurality of said primary sectors in said track being scanned; and scanning said alternate sectors for performing a mechanical preparatory operation for an ensuing data processing operation to be performed on the next scanned one of said track starting primary sectors.

17. The recorder set forth in claim 16 wherein said record disk is a magnetooptic recording disk said recorder having a magnetic bias field disposed in to intercept a track being scanned on said record disk and being reversible between an erase field intercepting the disk and a recording field intercepting the disk;

the improvement further including in combination:

program indicia in said program unit to be sensed by the microprocessor for causing said microprocessor to reverse the direction of said bias field as said preparatory step and the number of said alternate sectors being a sufficient number to require an elapsed time for the recorder to scan the alternate sectors which is greater than the bias field reversal time.

* * * * *